United States Patent [19]

Goodby et al.

[11] Patent Number: 4,561,726

[45] Date of Patent: Dec. 31, 1985

[54] ALIGNMENT OF FERROELECTRIC LCDS

[75] Inventors: John W. Goodby, Berkeley Heights; Thomas M. Leslie, Lebanon; Jayantilal S. Patel, Scotch Plains, all of N.J.

[73] Assignee: AT&T Bell Laboratories, Murray Hill, N.J.

[21] Appl. No.: 518,640

[22] Filed: Jul. 29, 1983

[51] Int. Cl.[4] ........................ G02F 1/13; G02F 1/135
[52] U.S. Cl. ............................ 350/341; 350/339 R; 350/350 S
[58] Field of Search ................. 350/341, 350 S, 339 R

[56] References Cited

U.S. PATENT DOCUMENTS

| 3,966,305 | 6/1976 | Young | 350/341 |
| 3,994,567 | 11/1976 | Matsuo et al. | 350/343 X |
| 4,002,404 | 1/1977 | Dir | 350/341 X |
| 4,068,923 | 1/1978 | Toida | 350/339 R X |
| 4,278,326 | 7/1981 | Kawamura et al. | 350/341 X |
| 4,291,948 | 9/1981 | Crossland et al. | 350/341 X |

FOREIGN PATENT DOCUMENTS

| 54-119263 | 9/1979 | Japan | 350/341 |
| 57-66420 | 4/1982 | Japan | 350/341 |

Primary Examiner—John K. Corbin
Assistant Examiner—Richard F. Gallivan
Attorney, Agent, or Firm—Bruce S. Schneider

[57] ABSTRACT

The alignment of liquid crystal materials in cells utilized for devices is significantly enhanced through the use of materials such as polyamides, polyimides, nylons, and polyesters. This expedient for alignment of liquid crystal materials is useful for nematic and cholesteric liquid crystals, but finds particularly advantageous use for aligning smectic liquid crystals.

18 Claims, 1 Drawing Figure

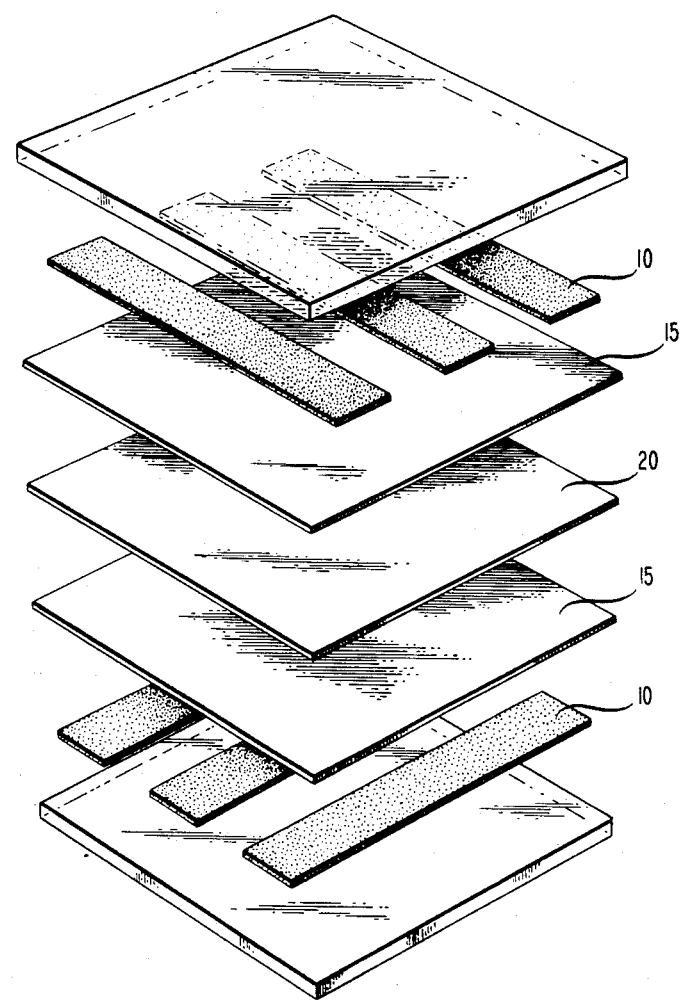

ALIGNMENT OF FERROELECTRIC LCDS

BACKGROUND OF THE INVENTION

1. Field of the Invention

This invention relates to devices which display information and, in particular, to liquid crystal based devices which display information.

2. Art Background

Liquid crystal based devices are widely used to display information. These devices, in general, have at least two optical states that depend on the molecular orientation of the liquid crystal material. One of these optical states is typically associated with a spatial ordering of the molecules. This ordering is most often changed through the application of an electrical field to yield a second molecular spatial configuration, and thus, a second optical state.

The desired spatial ordering is not necessarily inherent in the liquid crystal material. Generally, the liquid crystal material must be contacted with an order inducing substance before the relatively ordered state of the liquid crystal is assumed. This order inducing substance is typically incorporated into the device cell and continually contacts the liquid crystal material. The cell with its ordering substance and liquid crystal material is generally constructed by forming electrodes on a relatively transparent material, e.g., a glass plate. (The electrodes are employed to apply the necessary fields for optical state switching.) At least a portion of the transparent material on the electrode surface is then covered with the ordering substance. (Although for nematic liquid crystal devices the entire transparent material is covered, it has been reported that ferroelectric liquid crystal devices only operate properly when a polyester ordering material is kept from covering the region of the transparent material where information is ultimately to be displayed. See Kondo et al *Japanese Journal of Applied Physics*, 22(2), L85 (1983).) The two treated transparent media with the ordering material on each facing the other are spaced a desired distance, e.g., a distance typically in the range 0.5 to 100 $\mu$m, and the region between the plates filled through conventional techniques such as capillary action and vacuum filling.

Typically for cells relying on liquid crystal materials in a nematic phase, highly cross-linked polyimides have been utilized to establish the desired ordering. For example, PI 2555, a cross-linking polyimide sold by E. I. DuPont De Nemours and Company, Incorporated, when fully cured has been utilized to align liquid crystal material such as 4-n-pentyl-4-cyano-biphenyl. The resulting liquid crystal cells have been utilized extensively in a variety of applications such as for watch and calculator displays. However, the success of ordering nematic phase liquid crystal materials has not been extended to the ordering of liquid crystal materials in a smectic phase. Thus, devices relying on smectic liquid crystals such as those reported by Clark et al in *Applied Physics Letters*, 36, 899 (1980) have had contrasts over display size areas significantly less than those typically achieved with nematic based devices.

SUMMARY OF THE INVENTION

The ordering of liquid crystals in smectic phases has been significantly enhanced through the use of a specific ordering substance. In particular, liquid crystal materials in the smectic phase are strongly oriented by substances such as polyimides, polyamides, and polyesters that satisfy two criteria. They should be capable in the bulk form of being elongated at least 50 percent before fracturing in accordance with ASTM test method D-638, and that after an elongation of at least 50 percent, they should retain a length at least 20 percent more than the original length before elongation. Secondly, the ordering substance should have an average molecular weight of at least 8,000 atomic units, should be linear, and should have side chains that account, on average, for not more than 20 percent of the total polymer volume. These ordering substances also align nematic and cholesteric phase liquid crystal materials. However, most notably, very high contrasts of greater than 16:1 over large areas have been observed in ferroelectric devices such as described by Clark supra when the inventive ordering configuration is utilized as compared to essentially 1:1 contrast over large areas for the device as reported. Many commercially available substances, such as a wide variety of nylons, possess the required attributes that produce the inventive results.

BRIEF DESCRIPTION OF THE DRAWING

The FIGURE is an exploded view that is illustrative of one embodiment of the invention.

DETAILED DESCRIPTION

The ordering of liquid crystal materials is significantly enhanced through the use of particular ordering substances. These materials are preferably formed essentially entirely over the device electrodes (10 in the FIGURE) to contact the liquid crystal material in the area where electric fields are to be produced to induce a display of information. Once the liquid crystal orientation is established, it is possible to remove the ordering substance or to allow it to change chemical nature. For example, often cells, 1, are subjected to heat after ordering and this heat could produce various chemical changes such as cross-linking in the chemical substance. The ordering substance, 15, should have certain properties before ordering. Before alignment an ordering substance should be employed whose corresponding bulk form is capable of being elongated at least 50 percent before fracturing in accordance with ASTM D-638, and that after an elongation of at least 50 percent it should be capable of retaining a length at least 20 percent more than the original length before elongation. Additionally, the ordering material should have an average molecular weight of at least 8,000 atomic units, should be linear and should have side chains that account, on average, for not more than 20 percent of the total polymer volume. (Linear in this context means that a least-square-fit to the polymer backbone, i.e., the longest continuous valency bonded group of atoms in the polymer molecule, in its most elongated spatial configuration is essentially linear.) Cross-linked polymers such as those employed to orient nematic crystals do not elongate sufficiently, are not linear, and do not produce the desired orientation for smectic phase liquid crystal media.

A variety of materials satisfy the criteria relating to ordering substances. For example, polyamides such as many commonly available nylons are useful. Additionally, polyimides and polyesters that satisfy the criterion are available and are useful. Exemplary of useful materials are nylons including polycaprolactam (nylon 6) having a structure of

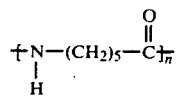

polyhexamethylene sebacamide (nylon 6/10)

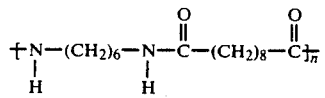

as well as nylon 6/12, nylon 11 and nylon 12, each respectively represented by the formula poly(hexamethylene dodecanodiamide) (nylon 6/12)

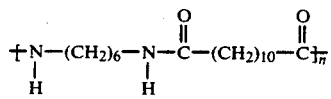

poly(undecanoamide) (nylon 11)

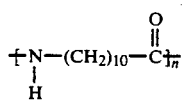

poly(lauryllactam) (nylon 12)

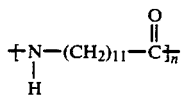

Additionally, polyesters such as polybutylene terephthalate and polyimides having limited cross-linking also satisfy the desired criteria. Other polymers such as polyethylene and polyvinyl alcohol are also satisfactory. However, materials such as polymethyl methacrylate because of their limited elongation and side groups do not produce the desired level of ordering and thus the desired increase in contrast.

It is also desirable, although not essential, that the ordering material, 15, not be soluble in the liquid crystal composition, 20, that is employed. Generally, if the ordering material is soluble, i.e., has a solubility greater than 10 percent, in the liquid crystal material, swelling of the ordering material is induced. This swelling has several undesirable effects. For example, swelling produces local distortions in the thickness of the cell and thus localized distortions in the perceived optical properties. Additionally, over time, a sufficient amount of the ordering material will dissolve so that large regions of impurities will be present in the liquid crystal material. The resulting composition discontinuities also produce undesirable optical variations in the cell. Thus, although utilization of an ordering material which is soluble in the liquid crystal composition is acceptable for limited time periods, over longer time periods this solubility leads to significantly degraded properties.

As previously discussed, the ordering substance, 15, is advantageously applied over the electrodes, 10, in the form of a thin film. It is desirable that the presence of the ordering substance does not unacceptably diminish the field strength produced by these electrodes. Although very low field strengths are capable of producing an optical change in liquid crystal materials, typically field strengths on the order of $10^4$ V per cm are utilized. For most practical applications, this field strength is produced with an applied voltage of less than 5 V. The device should also have certain optical properties. Generally the transparency of the device in the viewing regions, in the absence of the liquid crystal material, should be 90 percent or greater for light wavelengths in the range 2800 Å to 7000 Å. To conform to these practical considerations, the ordering substance when it is present in the regions where information is to be viewed should typically have a thickness in the range of 200 Å to 1 μm. A greater thickness usually attenuates field to an undesirable level while a thinner layer is difficult to form and often has discontinuities. These discontinuities lead to misalignment and thus low contrast regions of liquid crystal materials. Layers in this thickness range are easily deposited by conventional techniques such as spinning or spraying. (See E. Guyon et al, *Non-Emissive Electro-optic Displays*, (ed. A. R. Kmetz and E. K. Von Willisen, Plenum Press, 1976) for a description of such techniques.)

The ordering substance should, itself, be aligned before it is employed to orient liquid crystal materials. This alignment is achieved by propagating a zone of plastic deformation through the material which allows realignment of polymer chains. The desired effect is achieved by utilizing a combination of heat and pressure. This combination is attained by, for example, rolling the ordering substance with a material such as a cotton twill. For example, a roller is formed from polyester or nylon. This roller is pressed against the ordering material and with pressure moved across the material sufficiently fast so that some skidding occurs. The friction between the roller and the ordering substance causes the localized generation of heat. In conjunction with the pressure of the roller, this heat produces the desired plastic deformation. Although other expedients are possible for propagating an appropriate zone across the ordering substance, this roller method is preferred because of its convenience and simplicity. It is typically desirable but not essential that the zone of plastic deformation be propagated across the surface. However, it is possible to cause plastic deformation across the entire ordering layer by merely moving the ordering layer across the surface of a cloth material. To allow the appropriate ordering of liquid crystal material, the ordering substances which contact this material should be aligned in substantially the same direction, e.g., within 50 degrees of any other ordering material contacting the same volumetric region of the liquid crystal. Thus, it is advantageous to align the ordering substance on both plates of the device. This consistency in alignment is achieved by rolling the ordering substance layers in the same direction or 180 degrees out of phase. (This direction is considered in relationship to the spatial configuration of the ordering substance in the cell.)

The liquid crystal material should have a smectic A phase to allow appropriate ordering. This smectic A phase need not be the last phase produced upon increasing temperature before an isotropic state is reached. Nevertheless, cholesteric phases at higher temperatures than this smectic A phase should exist over a range not substantially more than 5 degrees. The larger the temperature range the less perfect the ultimate alignment and the faster the temperature should be decreased as the material passes through this cholesteric phase. In contrast, nematic phases which occur at temperatures higher than the smectic A phase do not affect the alignment of the liquid crystal and need not exist only through a narrow temperature range.

To produce the desired ordering, the liquid crystal is heated to a temperature that produces the isotropic phase. The liquid crystal material is contacted with the ordering substance. (The ordering substance should also be heated so that it does not induce immediate freezing of the isotropic liquid crystal.) The liquid crystal is allowed to cool. Upon reaching the smectic A phase, ordering is induced by the inventive ordering substances and this induced ordering is maintained as the liquid crystal cools and transforms through its normal phase sequence.

Contact between the liquid crystal material and the ordering material is produced by a variety of means such as vacuum or capillary filling. The former method is advantageous when the plates of the device are closely spaced, i.e., have a spacing of less than 20 μm while either procedure is desirable for plate spacings greater than 20 μm.

The following examples are illustrative of the inventive devices.

EXAMPLE 1

Glass slides coated with indium tin oxide were purchased from Optical Coating Laboratories, Incorporated. These slides were cut to dimensions of 2.5 cm by 2.5 cm. The glass plates were first cleaned in an ultrasonic detergent bath that was heated to a temperature of approximately 128 degrees C. The slides were then rinsed in deionized water and immersed in a concentrated sulfuric acid bath which contained a molar concentration of ammonium persulfate of approximately 0.014 moles/liter. After this immersion, the slides were again rinsed in deionized water and subsequently dried in a commercial freon dryer.

Each of two glass slide samples were placed on a spinning stage. A solution was prepared of 0.5 ml of VM651 (a commercial adhesion promotion product of E. I. DuPont De Nemours and Company, Incorporated) in 500 ml of methanol. This solution was allowed to sit overnight and sufficient solution was placed on each glass slide to wet the entire surface. (This solution acted as an adhesion promoter of the subsequent treatment with the ordering material.) The samples were spun at approximately 2000 rpm for 15 seconds. One of the ordering material solutions indicated in Table 1 having a concentration of 0.5 percent weight to volume was then placed over the promoter onto the glass slide. Again a sufficient amount of the ordering material solution was utilized to completely wet the surface of the slide. The samples were then spun at approximately 4000 rpm for approximately 50 seconds. The samples were then baked in an air convection oven at 130 degrees C. for approximately 30 minutes. This spinning procedure yielded a layer of ordering material which was approximately 200 Å in thickness as measured by a Tally-Step instrument.

A cotton twill cloth was supported on a hard horizontal surface and a straight edge was provided for the subsequent treatment of the samples. The samples were placed along the edge of the straight edge with the surface having the polymer layer contacting the cloth and stroked along approximately 15 cm of the cloth for 3 to 5 strokes. (Only gentle pressure was employed and the weight of the glass was basically sufficient to yield the desired result.) A dry nitrogen air gun was utilized to remove any cloth lint which adhered to the samples. A sharp straight edge having a thickness of approximately a tenth of a millimeter was dipped to a depth of approximately 1 mm along a width of 3 cm into Norland UV sealant type UVS91-NS. The immersed straight edge was then pressed firmly against one edge of each sample. The dipping procedure was then repeated and the straight edge touched firmly to the opposing edge on the same major surface of each sample. The second sample was then placed over the first sample in contact with the epoxy so that the treated side of each sample faced the other and so that the rubbed direction for each sample pointed approximately in the same direction. The samples were pressed together until the spacing between the two slides was approximately 25 μm as measured with a Zeiss light section microscope. The epoxy sealant was subjected to a broadband UV light source that had its center frequency at approximately 350 nm for 5 minutes. (The light had an intensity at the surface of the epoxy of approximately 10 milliwatts/cm².)

A liquid crystal material was prepared by combining six materials represented by the formulae

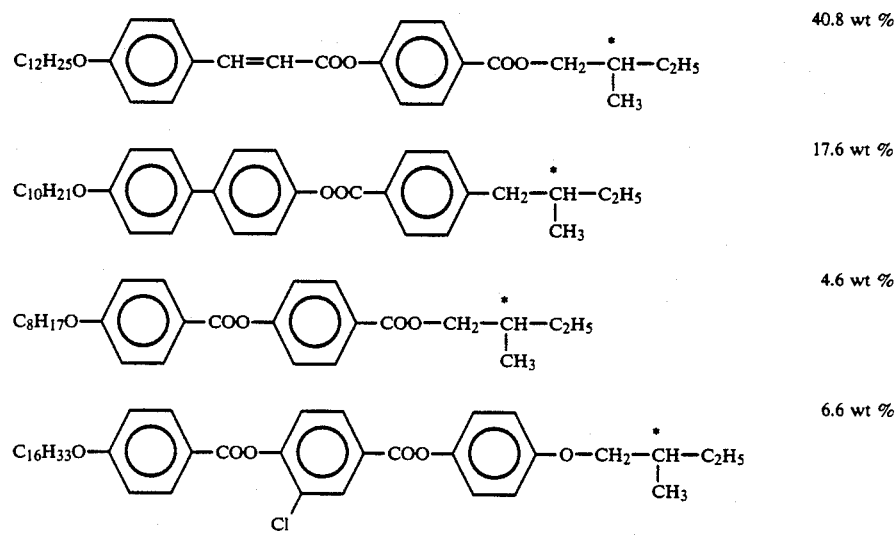

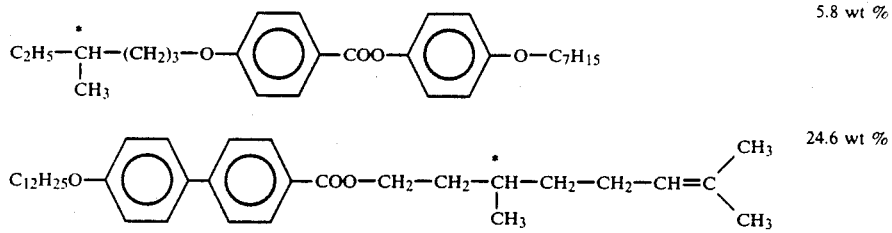

5.8 wt %

24.6 wt % yielding a mixture which had the phase sequence

The resulting liquid crystal paste was placed along the edge of the glass slide package. The package filled by capillary action was placed in a Mettler FP-52 microfurnace and the furnace was heated to approximately 120 degrees C. The temperature of the furnace was then decreased at a rate of approximately 3 degrees C. per minute until room temperature was reached. Each sample was then removed from the oven and examined between crossed polarizers. The samples were then examined under a transmitted light, optical microscope with the polarizer and analyzer crossed. A 6 V, 20 W tungsten lamp was utilized to illuminate the sample. The sample was rotated and the minimum and maximum light observed in the microscope during a 360 degree rotation was noted for the smectic A phase. The ratio of these two values yielded a contrast. For all the samples shown in Table 1 the contrast was approximately 16:1 except for polyimide which showed a slightly decreased contrast.

EXAMPLE 2

The same procedure was followed for the materials in Table 2. The samples were examined between crossed polarizers as described in Example 1 and all exhibited a contrast over the 1 cm$^2$ sample of significantly less than 5.

EXAMPLE 3

The procedure of Example 1 was followed utilizing nylon 6/9 as the ordering material. However, the indium tin oxide material for each glass sample was patterned in an array of 0.117 cm wide strips with a space of 0.010 between each strip. The glass slides, when they were formed into the package, were positioned so that the long axis of the strips of one sample was perpendicular to the long axis of the strips for the second sample. The space between the glass slides was approximately 4 μm. All the strips of each slide were short circuited and a voltage of 5 V was applied between the strips of one slide and the strips of the second slide. The switching contrast observed between the dark and light states of the sample was approximately 10:1.

EXAMPLE 4

The procedure of Example 1 was followed except the nylon material was patterned to remove nylon in the seal area and in areas where electrical contact were to be made. This patterning was done utilizing a commercial near ultraviolet resist to mask regions of the nylon that were not to be removed. To remove the exposed regions of the nylon surface the sample was immersed for approximately 200 seconds in a solution of 80 percent concentrated sulfuric acid and 20 percent water. Residual etchants were removed utilizing a deionized water rinse. The photoresist was also removed utilizing acetone.

TABLE 1

| Solvent | Chemical Name | Common Name |
| --- | --- | --- |
| B* | poly(ethylene) $+CH_2CH_2\}_n$ | PE |
| C | poly(vinyl alcohol) $+CH_2-CH\}_n$ \| OH | PVA |
| A | poly(hexamethylene adipamide) $+NH(CH_2)_6-NH-CO(CH_2)_4-CO\}_n$ | Nylon 6/6 |
| A | poly(hexamethylene nonanediamide) $+NH(CH_2)_6-NH-CO(CH_2)_7-CO\}_n$ | Nylon 6/9 |
| A | poly(hexamethylene terephthalamide) $+NH(CH_2)_6-NH-CO-\bigcirc-CO\}_n$ | Nylon 6/T |
| B | poly(1,4-butylene terephthalate) $+(CH_2)_4-COO-\bigcirc-COO\}_n$ | |
| B | poly(1,4-ethyleneterephthalate) $+(CH_2)_2-OOC-\bigcirc-COO\}_n$ | |

*Solvents used hot (60 degrees C) and solution freshly prepared

Mixtures of Polymers

| Solvent | Chemical Name | Common Name |
| --- | --- | --- |
| A | 80:20 60:40 50:50 40:60 20:80 (wt %) | Nylon 11-Nylon 12 |
| A | 50:50 | Nylon 6-Nylon 11 |
| A | 50:50 | Nylon 6-Nylon 6/6 |
| A | 33⅓:33⅓:33⅓ | Nylon 6/12-Nylon 6/9-Nylon 11 |
| A | 25:25:25:25 | Nylon 6/4-Nylon 6/6-Nylon 6/11-Nylon 6/12 |
| A | 50:50 | Nylon 6/9-Nylon 11 |
| A | 50:50 | Nylon 6/12-Nylon 11 |

Solvents for polymers

| | |
| --- | --- |
| A-60% | m-cresol |
| 40% | methanol |
| B-50% | o-chlorophenol |
| 50% | 1,1,2,2-tetrachloroethane |
| C-80% | methanol |
| 20% | water |

TABLE 2

| Polymers That Did Not Align | |
| --- | --- |
| A | poly(cyclohexylmethacrylate) |

TABLE 2-continued

Polymers That Did Not Align $$+CH_2-C+_n$$
with COO—phenyl (H) and CH₃ substituents A  poly(amine resin)
   cross-linked nylons
A  poly(vinylmethyl ketone)

$$+CH_2-CH+_n$$
$$\quad\quad |$$
$$\quad CO-CH_3$$

A  poly(vinyl cinnamate)

$$+CH_2-CH+_n$$
$$\quad\quad |$$
$$\quad OOC-CH=CH-\text{phenyl}$$

B  poly(acetal)

$$+CH_2-C+_n$$
with OC₂H₅ substituents

B  poly(benzylmethacrylate)

$$+CH_2-C+_n$$
with COOCH₂—phenyl and CH₃ substituents

A  poly(brene)

$$+N^+-(CH_2)_6-N^+-(CH_2)_3+_n \, Br^-$$
with CH₃ substituents

What is claimed is:

1. A device for affecting incident electromagnetic radiation comprising a liquid crystal material, an ordering material, and a means for producing an electric field characterized in that said ordering material contacts said liquid crystal material in a region where at least a portion of said electromagnetic radiation is to be affected by subjecting said region to an electric field through said means for producing an electric field and wherein said ordering substance comprises a polymer that has an average molecular weight of at least 8,000 atomic units, that is linear, that has substituents that occupy less than 20 percent of the volume occupied by said polymer, that is capable in bulk of being elongated more than 50 percent, and that in bulk after an elongation of at least 50 percent retains a length that is at least 20 percent greater than the original length before elongation wherein said polymer comprises a member chosen from the group consisting of nylons and polyethylenes.

2. The device of claim 1 wherein said nylon comprises a material represented by the formula $$+N-(CH_2)_6N-C-(CH_2)_{10}-C+_n$$
$$\,\,|\quad\quad\,\,\,\,|\quad\,\|\quad\quad\quad\quad\,\|$$
$$\,\,H\quad\quad\,\,H\quad O\quad\quad\quad\quad O$$

3. The device of claim 1 wherein said nylon comprises a material represented by the formula $$+N-(CH_2)_{10}-C+_n$$
$$\,\,|\quad\quad\quad\,\,\,\|$$
$$\,\,H\quad\quad\quad\,\,O$$

4. The device of claim 1 wherein said nylon comprises a material represented by the formula $$+N-(CH_2)_{11}-C+_n$$
$$\,\,|\quad\quad\quad\,\,\,\|$$
$$\,\,H\quad\quad\quad\,\,O$$

5. The device of claim 1 wherein said nylon comprises a material represented by the formula $$+N-(CH_2)_6-N-C-(CH_2)_8-C+_n$$
$$\,\,|\quad\quad\quad\,\,|\quad\|\quad\quad\quad\,\|$$
$$\,\,H\quad\quad\quad\,H\,O\quad\quad\quad O$$

6. The device of claim 1 wherein said polymer comprises polyethylene.

7. A device for affecting incident electromagnetic radiation comprising a liquid crystal material, an ordering material, and a means for producing an electric field characterized in that said ordering material contacts said liquid crystal material in a region where at least a portion of said electromagnetic radiation is to be affected by subjecting said region to an electric field through said means for producing an electric field and wherein said ordering substance comprises a polymer that has an average molecular weight of at least 8,000 atomic units, that is linear, that has substituents that occupy less than 20 percent of the volume occupied by said polymer, that is capable in bulk of being elongated more than 50 percent, and that in bulk after an elongation of at least 50 percent retains a length that is at least 20 percent greater than the original length before elongation wherein said liquid crystal comprises a ferroelectric material.

8. The device of claim 1 wherein said means for applying a field comprises an electrode.

9. The device of claim 7 wherein said polymer comprises a polyester.

10. The device of claim 9 wherein said polyester comprises polybutylene terephthalate.

11. The device of claim 9 wherein said polyester comprises polyethylene terephthalate.

12. The device of claim 7 wherein said polymer comprises polyvinyl alcohol.

13. The device of claim 7 wherein said polymer comprises polyethylene.

14. The device of claim 7 wherein said polymer comprises nylon.

15. The device of claim 14 wherein said nylon comprises a material represented by the formula

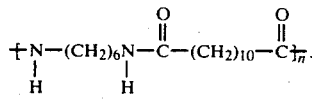
16. The device of claim 14 wherein said nylon comprises a material represented by the formula
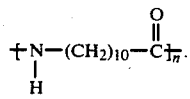
17. The device of claim 14 wherein said nylon comprises a material represented by the formula
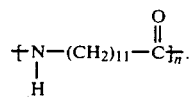
18. The device of claim 14 wherein said nylon comprises a material represented by the formula
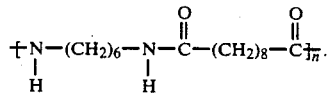
* * * * *